2,926,193
Patented Feb. 23, 1960

2,926,193

4-CHLORO-α-DIMETHYLAMINO-6-PHENYL-o-CRESOL

Raymond H. Rigterink, Midland, Mich., assignor to The Dow Chemical Company, Midland, Mich., a corporation of Delaware No Drawing. Application April 23, 1956
Serial No. 579,776

1 Claim. (Cl. 260—570.9)

This invention is directed to 4-chloro-α-dimethylamino-6-phenyl-o-cresol having the structure

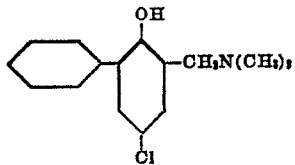

This new compound is a white crystalline solid soluble in most organic solvents such as acetone, xylene and petroleum ether. It has low solubility in water. The compound has utility as an antioxidant and is adapted to be employed to stabilize oil and plastic compositions against air oxidation.

The compound of this invention may be prepared by causing 4-chloro-2-phenylphenol, formaldehyde and dimethylamine to interact. The reaction takes place smoothly in the temperature range of from 15° to 120° C. A solvent such as ethanol may be employed as reaction medium.

In the preferred method of carrying out this reaction equimolar proportions of 4-chloro-2-phenylphenol and dimethylamine are combined. Usually the phenol and aqueous dimethylamine are mixed with stirring. To the resulting mixture, an equimolar proportion of formaldehyde is added portionwise with stirring. An exothermic reaction occurs and cooling is employed during the addition. Upon completion of the addition, the mixture is heated and stirred for several hours to obtain the desired 4-chloro-α-dimethylamino-6-phenyl-o-cresol. The latter precipitates as crystals when the reaction mixture cools. The crystalline product may be purified by recrystallization from a solvent such as ethanol.

In a representative operation, 800 grams (4.45 moles) of a 25 percent aqueous dimethylamine solution was added with stirring to an equimolar proportion of 4-chloro-2-phenylphenol. To the resulting heterogeneous mixture, 361 grams (4.45 moles) of a 37–38 percent aqueous formaldehyde solution was added portionwise with stirring. An exothermic reaction occurred and cooling was employed to manitain the temperature below 45° C. The resulting mixture was stirred to provide good contact between organic phase and aqueous phase and heated at about 96° C. under reflux for two hours to obtain an oily 4-chloro-α-dimethylamino-6-phenyl-o-cresol product. After completion of the heating the mixture was cooled whereupon the oily product solidified. The latter was recrystallized from ethanol to recover a white crystalline product melting at 65°–66.5° C. in a yield of 1114 grams or 95.9 percent of theoretical.

The 4-chloro-α-dimethylamino-6-phenyl-o-cresol product of the present invention is a good antioxidant and is adapted to be employed as a stabilizer against air oxidation in compositions.

In a representative test, a sample of a 0.25 percent solution of carotene in corn oil containing 0.1 percent by weight of 4-chloro-α-dimethylamino-6-phenyl-o-cresol product and an unmodified control sample were exposed in an air chamber at 60° C. for 72 hours. At the end of this period the extent of oxidation was determined by measuring the decrease in light absorbance spectrophotometrically and compared with a standard decrease of the control where no inhibitor was added. The compound was then rated on an inhibition scale.

The results rated the 4-chloro-α-dimethylamino-6-phenyl-o-cresol product to have a value of 40. This rating is comparable to the 40–50 values of inhibitors and the same as that given to 4-tertiary-butylpyrocatechol, a presently commercial employed antioxidant.

I claim:
4-chloro-α-dimethylamino-6-phenyl-o-cresol.

References Cited in the file of this patent

UNITED STATES PATENTS

| | | |
|---|---|---|
| 2,033,092 | Bruson | Mar. 2, 1936 |
| 2,045,517 | Bruson | June 23, 1936 |
| 2,220,835 | Bruson | Nov. 5, 1940 |

OTHER REFERENCES

Burckhalter: Journal of the American Chemical Society, vol. 72, p. 5310 (1950).
Burckhalter et al.: Journal of the American Chemical Society, vol. 68, pp. 1894–1903 (1946).